(12) United States Patent
Takeuchi

(10) Patent No.: US 9,414,035 B2
(45) Date of Patent: Aug. 9, 2016

(54) IMAGE CAPTURING APPARATUS PROVIDED WITH A FUNCTION OF COMBINING A PLURALITY OF CAPTURED IMAGES

(71) Applicant: CANON KABUSHIKI KAISHA, Tokyo (JP)

(72) Inventor: Yoshitaka Takeuchi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/760,857

(22) Filed: Feb. 6, 2013

(65) Prior Publication Data

US 2013/0215288 A1    Aug. 22, 2013

(30) Foreign Application Priority Data

Feb. 8, 2012 (JP) ................. 2012-025286

(51) Int. Cl.
| | | |
|---|---|---|
| H04N 7/18 | (2006.01) | |
| H04N 9/73 | (2006.01) | |
| H04N 9/67 | (2006.01) | |
| H04N 5/235 | (2006.01) | |
| H04N 5/232 | (2006.01) | |
| H04N 9/04 | (2006.01) | |

(52) U.S. Cl.
CPC ............ H04N 9/73 (2013.01); H04N 5/2355 (2013.01); H04N 9/67 (2013.01); *H04N 5/2356* (2013.01); *H04N 5/23232* (2013.01); *H04N 9/045* (2013.01)

(58) Field of Classification Search
CPC . H04N 5/23229; H04N 9/045; H04N 5/2355; H04N 5/265; H04N 5/235; H04N 5/2353; G06T 2207/10016; G06T 5/50; G06T 2207/20221; G06T 7/0075; G06T 2207/10012; G06T 2207/10024; G06T 3/4015; G06T 5/002
USPC .......... 348/223.1, 231.2, 231.3, 231.9, 231.6, 348/272, 273, 277, 280
See application file for complete search history.

(56) References Cited

U.S. PATENT DOCUMENTS

| | | | |
|---|---|---|---|
| 2002/0054220 A1 | 5/2002 | Takeuchi | |
| 2007/0013777 A1* | 1/2007 | Inoue et al. | ................... 348/143 |
| 2008/0055683 A1* | 3/2008 | Choe et al. | ................... 358/525 |
| 2008/0084880 A1 | 4/2008 | Dharwadkar | |
| 2009/0021594 A1* | 1/2009 | Tsuda et al. | ............... 348/222.1 |

FOREIGN PATENT DOCUMENTS

| | | |
|---|---|---|
| CN | 1917611 A | 2/2007 |
| CN | 101116325 A | 1/2008 |
| CN | 101141571 A | 3/2008 |

(Continued)

*Primary Examiner* — Twyler Haskins
*Assistant Examiner* — Carramah J Quiett
(74) *Attorney, Agent, or Firm* — Canon USA, Inc. I.P. Division

(57) ABSTRACT

The present invention provides a digital camera which can overlay a plurality of images in multiple exposure shooting without intermingling with each other. A digital camera includes an image sensor constituted by a color filter for a plurality of color components, an imaging unit configured to capture a subject image with the image sensor and output the image data, a comparison unit configured to compare first image data output from the imaging unit with second image data output from the imaging unit between image data in corresponding regions within a screen, and a selecting unit to output either the first image data or the second image data for each region according to a comparison result.

15 Claims, 15 Drawing Sheets

(56) References Cited

FOREIGN PATENT DOCUMENTS

| CN | 101426090 A | 5/2009 |
|---|---|---|
| CN | 100539645 C | 9/2009 |
| CN | 101661154 A | 3/2010 |
| JP | H11-225308 A | 8/1999 |
| JP | 2002-223452 A | 8/2002 |
| JP | 2003-319404 A | 11/2003 |
| JP | 2004-297407 A | 10/2004 |
| JP | 2006-128740 A | 5/2006 |

* cited by examiner

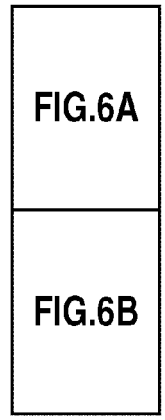
FIG.6
FIG.6A
FIG.6B
FIG.6A
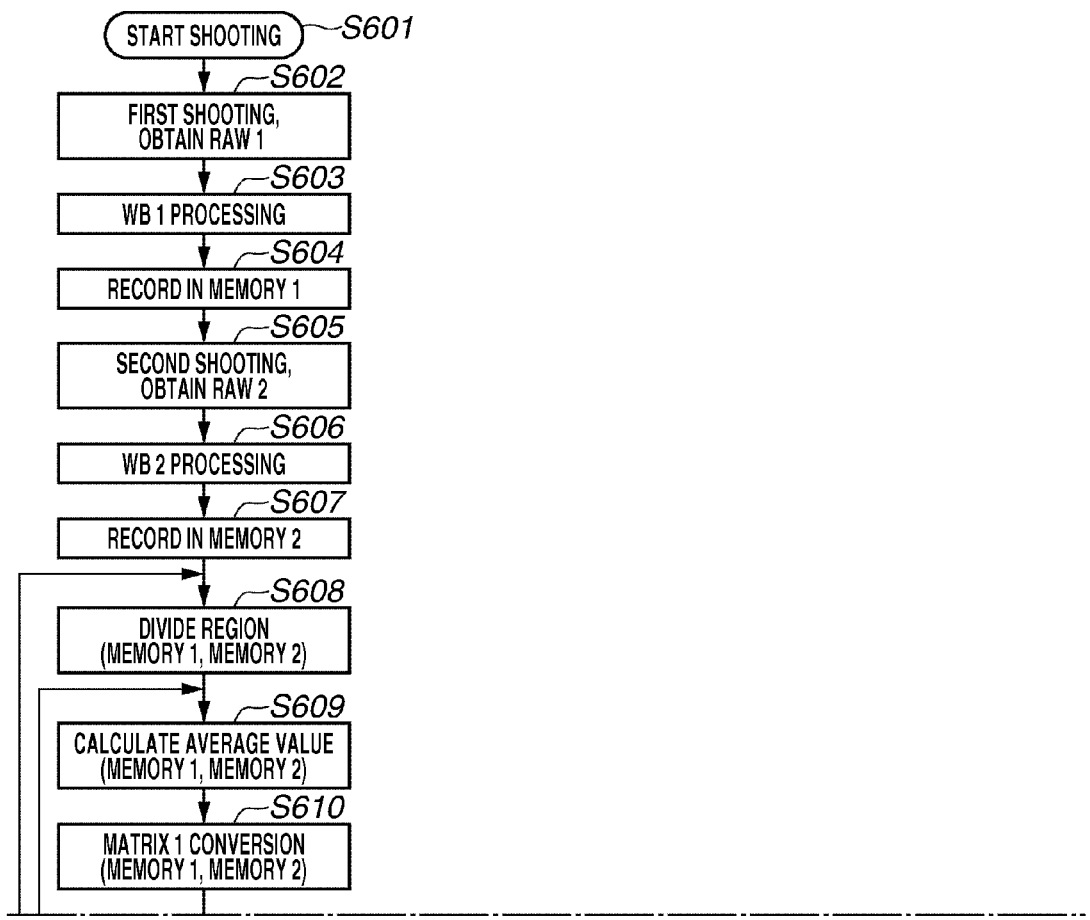

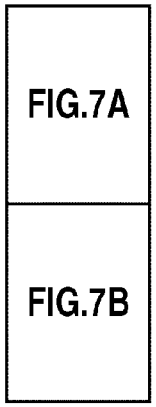
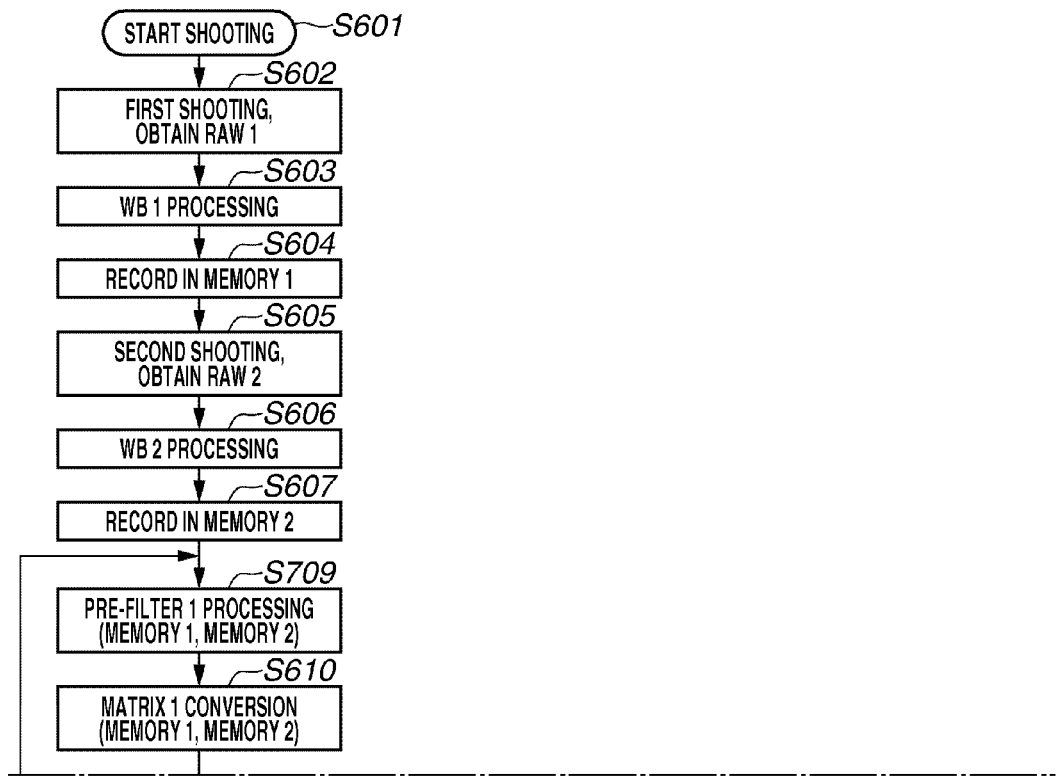

| Y 00 | Y 01 | Y 02 | Y 03 | Y 04 | Y 05 |
|------|------|------|------|------|------|
| Y 10 | Y 11 | Y 12 | Y 13 | Y 14 | Y 15 |
| Y 20 | Y 21 | Y 22 | Y 23 | Y 24 | Y 25 |
| Y 30 | Y 31 | Y 32 | Y 33 | Y 34 | Y 35 |

FIG.10B

| Cr 00 | Cr 01 | Cr 02 | Cr 03 | Cr 04 | Cr 05 |
|-------|-------|-------|-------|-------|-------|
| Cr 10 | Cr 11 | Cr 12 | Cr 13 | Cr 14 | Cr 15 |
| Cr 20 | Cr 21 | Cr 22 | Cr 23 | Cr 24 | Cr 25 |
| Cr 30 | Cr 31 | Cr 32 | Cr 33 | Cr 34 | Cr 35 |

FIG.10C

| Cb 00 | Cb 01 | Cb 02 | Cb 03 | Cb 04 | Cb 05 |
|-------|-------|-------|-------|-------|-------|
| Cb 10 | Cb 11 | Cb 12 | Cb 13 | Cb 14 | Cb 15 |
| Cb 20 | Cb 21 | Cb 22 | Cb 23 | Cb 24 | Cb 25 |
| Cb 30 | Cb 31 | Cb 32 | Cb 33 | Cb 34 | Cb 35 |

FIG.10D

| Br 00 | Br 01 | Br 02 | Br 03 | Br 04 | Br 05 |
|-------|-------|-------|-------|-------|-------|
| Br 10 | Br 11 | Br 12 | Br 13 | Br 14 | Br 15 |
| Br 20 | Br 21 | Br 22 | Br 23 | Br 24 | Br 25 |
| Br 30 | Br 31 | Br 32 | Br 33 | Br 34 | Br 35 |

FIG.10E

| S 00 | S 01 | S 02 | S 03 | S 04 | S 05 |
|------|------|------|------|------|------|
| S 10 | S 11 | S 12 | S 13 | S 14 | S 15 |
| S 20 | S 21 | S 22 | S 23 | S 24 | S 25 |
| S 30 | S 31 | S 32 | S 33 | S 34 | S 35 |

FIG.10F

| H 00 | H 01 | H 02 | H 03 | H 04 | H 05 |
|------|------|------|------|------|------|
| H 10 | H 11 | H 12 | H 13 | H 14 | H 15 |
| H 20 | H 21 | H 22 | H 23 | H 24 | H 25 |
| H 30 | H 31 | H 32 | H 33 | H 34 | H 35 |

IMAGE CAPTURING APPARATUS PROVIDED WITH A FUNCTION OF COMBINING A PLURALITY OF CAPTURED IMAGES

BACKGROUND OF THE INVENTION

1. Field of the Invention

The present invention relates to an imaging apparatus provided with a multiple exposure shooting function to combine a plurality of captured images.

2. Description of the Related Art

There are two methods for performing multiple exposure shooting. By one method, after shooting a scene a plurality of times, data from an image sensor is simply subjected to an addition process. By another method as discussed in Japanese Patent Application Laid-Open No. 2006-128740, after a division process is performed which reduces exposure by a number of shootings to be subjected to the addition process, the addition process is performed. In either case, the image data subjected to the addition process is developed, recorded in a recording medium, and the multiple exposure shooting is ended. In the latter method, even if a plurality of images is multiplexed, the images are averagely multiplied by a negative gain corresponding to a number of multiplexed images, so that the combined images are hard to be saturated or to fail.

However, in the conventional art as discussed in Japanese Patent Application Laid-Open No. 2006-128740, there is a case where a desired image is not obtained. For example, when multiple shooting of the moon above a nighttime mountain shown in FIG. 11A and a cloud on a daytime mountain shown in FIG. 11B is carried out and captured images are combined, combined images may not be a desired one. In the nature of things, a picture as shown in FIG. 11D is natural, which retains original brightness of the moon and cloud. However, in the conventional image processing method in the multiple shooting which uses the simple addition or the average addition, brightness of the moon and sky, or the sky, cloud and mountain mix with each other, so that a bit darkened and unnatural image is obtained.

SUMMARY OF THE INVENTION

The present invention provides an image capturing apparatus provided with a multiple exposure function that can appropriately overlay a plurality of images at the time of combining images in multiple exposure shooting.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A and 6B include a flowchart corresponding to the image processing in FIG. 1.

FIGS. 7A and 7B include a flowchart corresponding to the image processing in FIG. 2.

FIGS. 9A to 9G are diagrams illustrating a configuration of color components of each pixel of image data according to the exemplary embodiment of the present invention.

FIGS. 10A to 10F are diagrams illustrating data of each pixel after filter processing or matrix conversion processing is performed.

DESCRIPTION OF THE EMBODIMENTS

Various exemplary embodiments, features, and aspects of the invention will be described in detail below with reference to the drawings.

Figure 5:
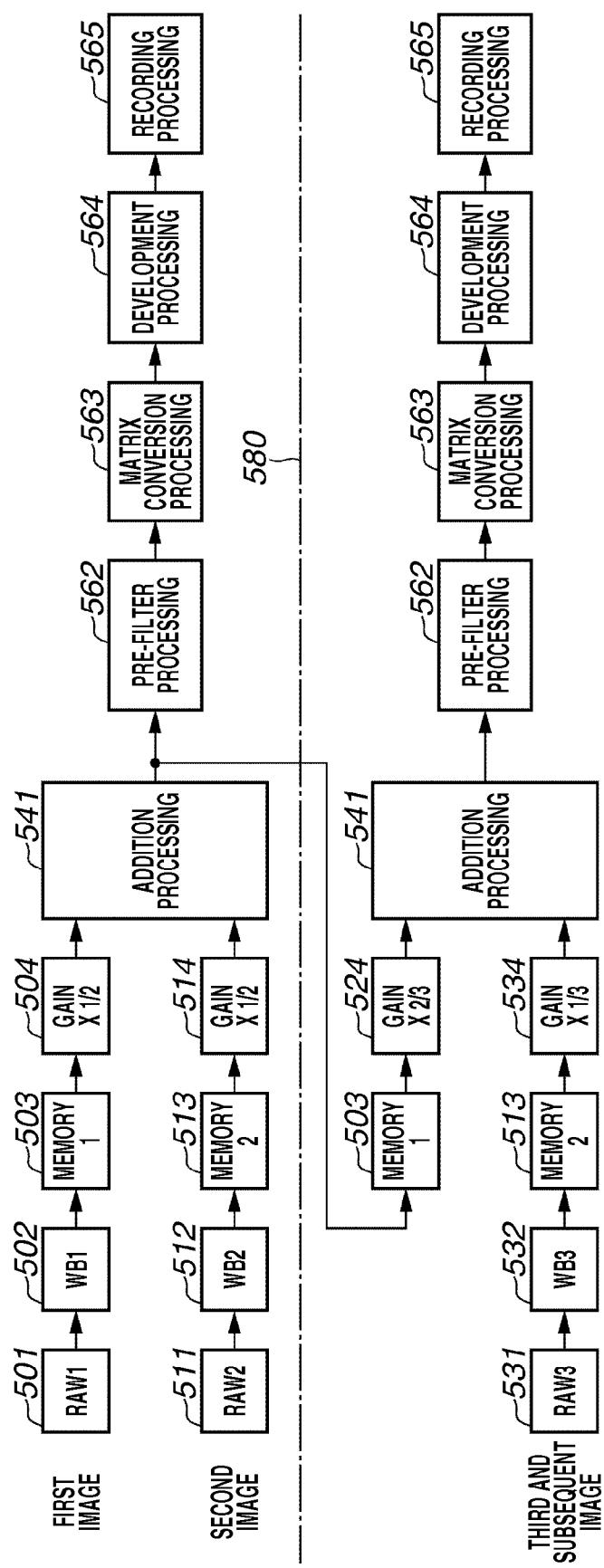
FIG. 5 is a diagram illustrating a flow of conventional multiplexing processing.

With reference to FIG. 5, multiple exposure shooting (shooting for generating a combined image using the shot images) performed by a general automatic exposure correction method will be described below.

Image data RAW 1 (501) which is captured in first shooting by a digital camera is subjected to white balance processing 1 in a white balance processing unit 1 (502), and is once stored in a memory 1 (503).

Negative gain acts on this image data processed in the white balance processing 1, by a number of the multiple exposure, for use in combining images. In the present case, since the combination of two shootings is performed, gain of ½ acts on the image data (504).

Similarly, digitalized image data RAW 2 (511) obtained in second shooting is subjected to white balance processing in a white balance processing unit 2 (512). The processed image data RAW 2 (511) is once stored in a memory 2 (513) and then negative gain of ½ acts on the image in (514). After that, the image data twice shot is subjected to addition processing in an addition unit (541) with respect to each pixel located at the same position of two screens.

The combined images thus added is subjected to demosaic processing in a pre-filter (562). As an example, RAW image data obtained by an image sensor is taken up in which three color filters of RGB are arranged in a Bayer array as illustrated in FIG. 9A.

Figures 9A, 9B, 9C, 9D, 9E, 9F, 9G:
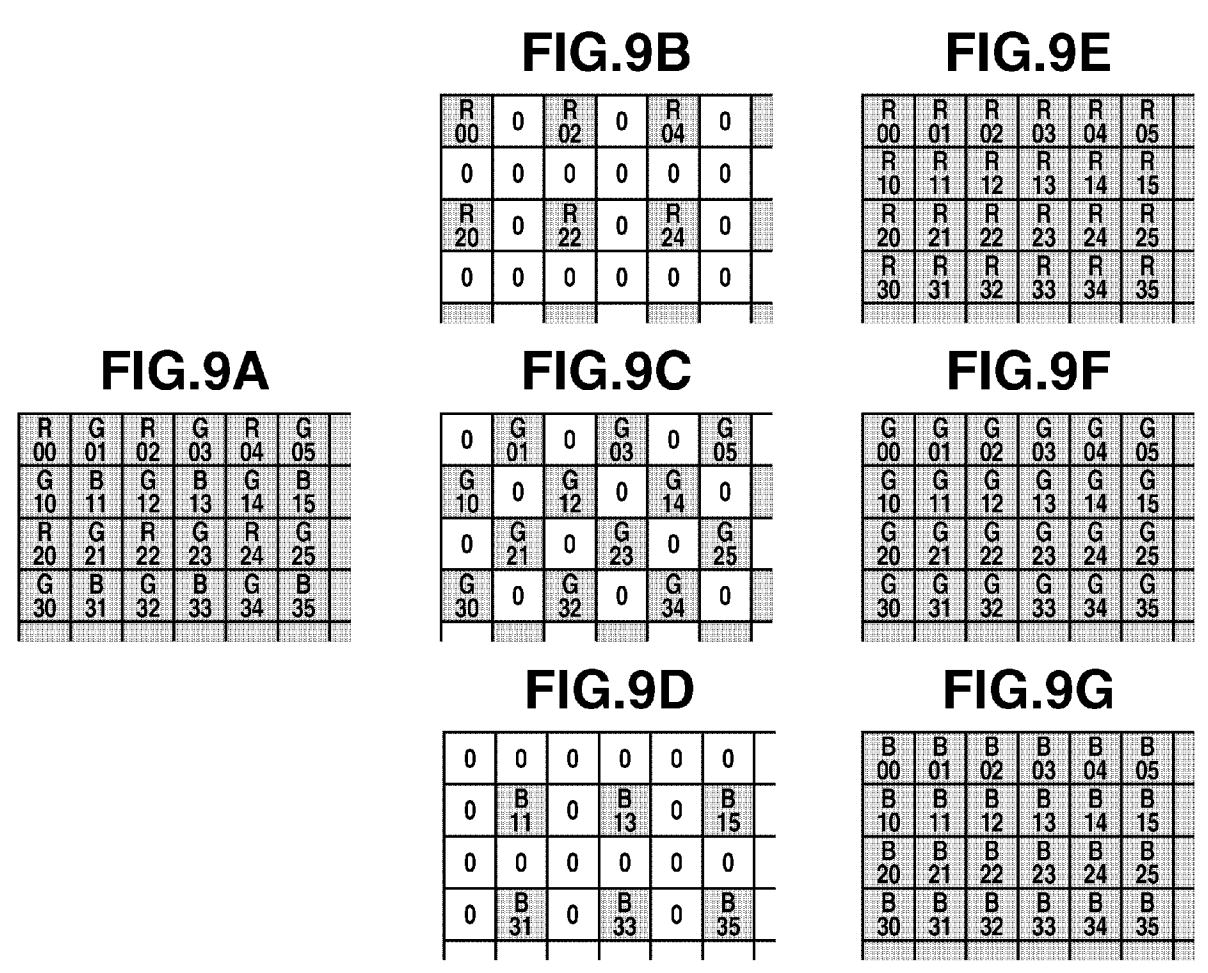

The data arranged in the array illustrated in FIG. 9A is divided into three planes 9B, 9C, and 9D of R pixel, G pixel, and B pixel respectively. Zero is inserted into pixels where no data is present. Then, each plane is tap-filtered in a horizontal and a vertical direction (562), and filled with zeros from FIG. 9B to FIG. 9E, from FIG. 9C to FIG. 9F, and from FIG. 9D to FIG. 9G. For example, a filter with three taps may have low pass filter characteristics of "1-2-1", and a filter with five taps may have low pass filter characteristics of "1-4-6-4-1".

Matrix conversion processing (563) is performed on the thus obtained image data of RGB three planes, in which RabGabBab is matrix-converted into image data of one screen of a luminance signal Y ab, a color difference signal Cr ab and a color difference signal Cb ab as shown in FIGS. 10A, 10B, and 10C, for each pixel in FIG. 9E, FIG. 9F, and FIG. 9G.

Various image processing such as gamma correction, sharpness processing, and color conversion processing is performed on the YCrCb data in development processing (564). As a result, final image data in the multiple shooting is obtained and output to be recorded in a recording medium (565). With that, the multiple addition processing of the image data captured in the first and second shooting is completed.

A case where a third shooting result is further multiplexed on the multiple images in the first and second shooting will be described below with reference to a separated part of a block diagram shown under a dashed line. Since hardware devices used in this case has common components with the hardware used in the multiple addition processing in the first and second shooting, in describing the lower part under the dashed line, common reference numerals is used for the memory and the image processing such as the addition processing and the development processing.

When the third shooting result is multiplexed, output data in which the first RAW data is added (541) to the second RAW data, is accumulated in the memory 1 (503) in advance. When the third shooting is carried out, a third captured image RAW 3 (531) is subjected to white balance processing in a white balance processing unit 3 (532) and once stored in a memory 2.

When the image data read out from the memory 1 (503) in which the first captured image is added to the second captured image, is added to the third captured image read out from the memory 2 (513), brightness is distributed between the first and second two images in two shootings, and the third shooting. The image data in the first and second shootings is multiplied (524) by negative gain of ⅔, and the image data in the third shooting is multiplied (534) by negative gain of ⅓, and addition is carried out (541) for each pixel.

Then, with respect to the data subjected to the addition processing, the demosaic processing and filter processing are performed on the image data arrayed in FIG. 9A, in the pre-filter (562) similar to the development processing of the first and second addition results. After that, the matrix conversion processing (563) and the development processing (564) are carried out and then final data of the multiple addition image for the three shootings is recorded in the recording medium.

Thus, even if a plurality of images is multiplexed, the images are averagely multiplied by a negative gain for a number of multiplexed images, so that the multiple shooting of an automatic exposure correction type can be carried out, in which the combined images are hard to be saturated or to fail.

Compared with the above described configuration, according to the present exemplary embodiment, when two capture images are combined, each image is divided into a region including a plurality of pixels, and based on an average value of R, G, and B pixels, brightness (Br), saturation (S), and hue (H) are acquired. The acquired Br, S, and H are compared between regions located at the same position, and a pixel in a region showing a larger value between them remains. An image of an entire screen obtained by this substitution are processed and output, which is a point of the present exemplary embodiment.

Figure 1:
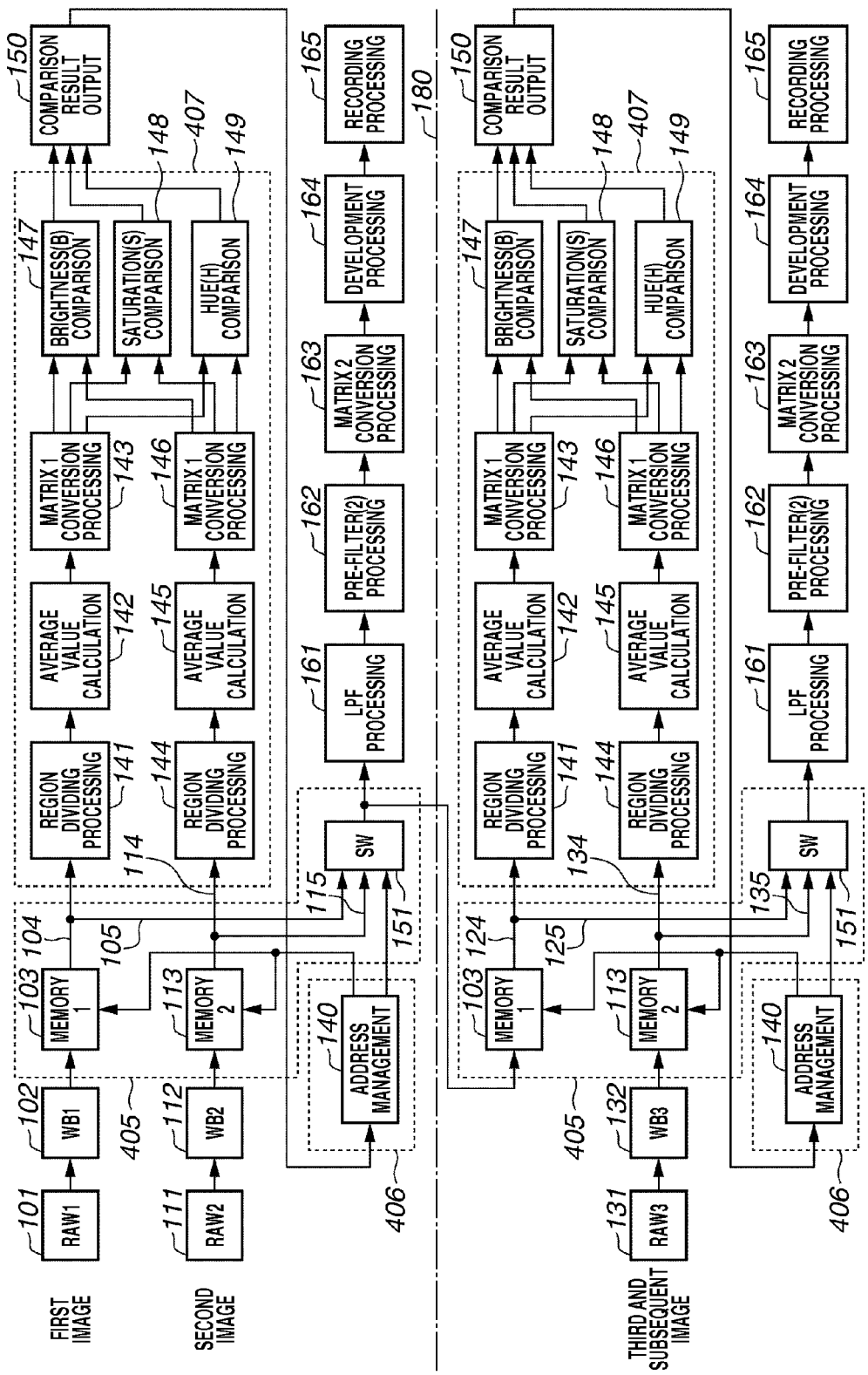
FIG. 1 is a block diagram illustrating a processing flow of multiple shooting by a digital camera according to a first exemplary embodiment of the present invention.
Figure 6B:
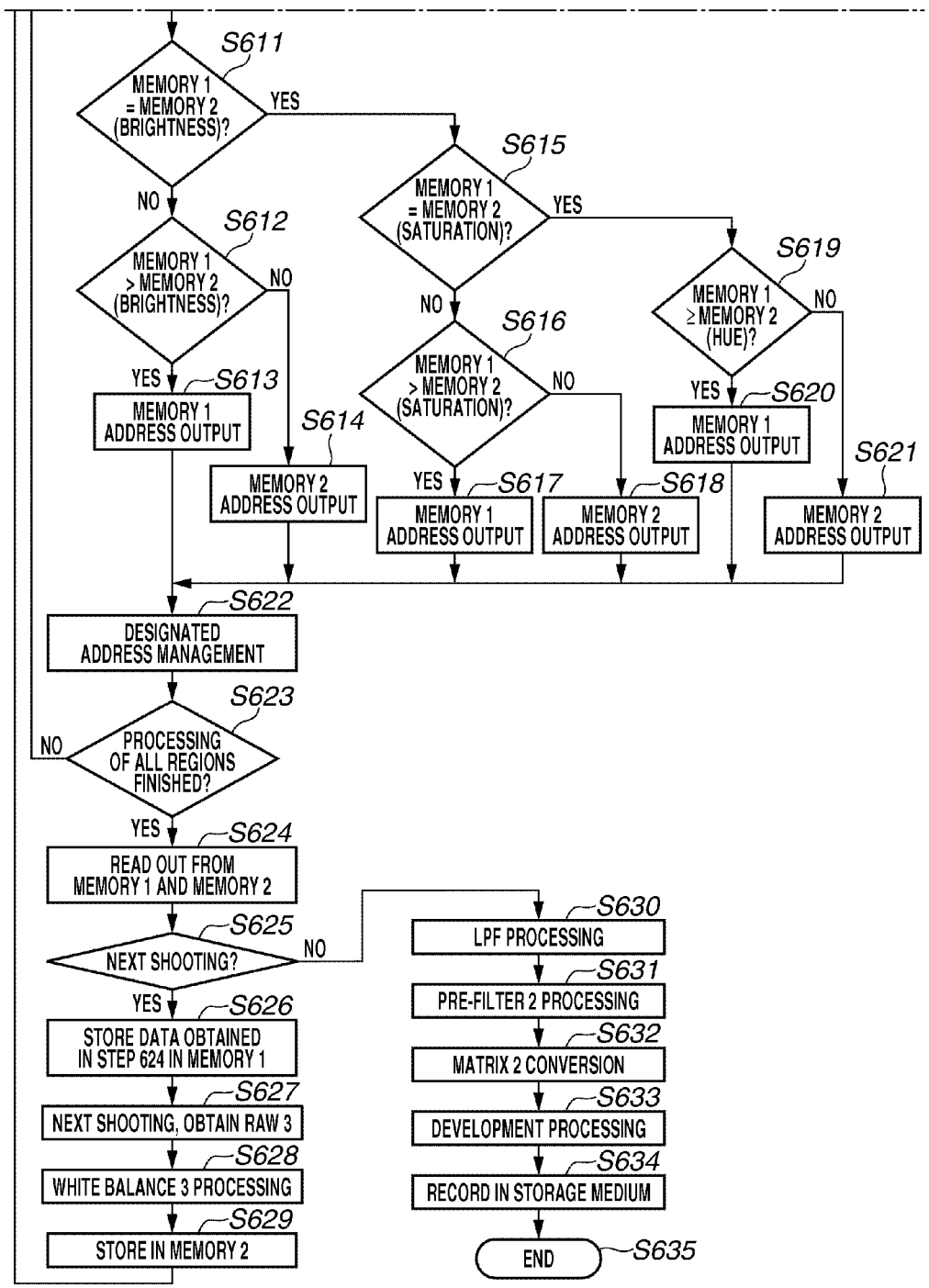

The exemplary embodiment of the present invention will be described in detail below with reference to the drawings. FIG. 1 is a block diagram illustrating a flow of image processing according to the first exemplary embodiment of the present invention. FIG. 6 is a flowchart illustrating the processing in FIG. 1.

Figure 4:
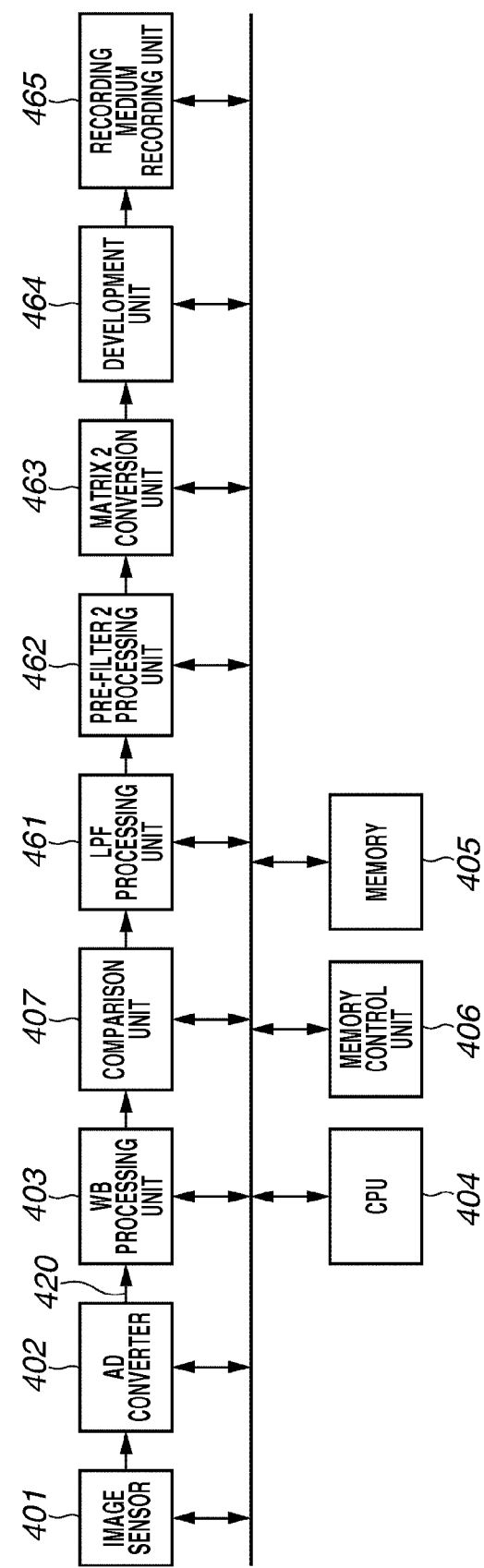
FIG. 4 is a block diagram illustrating a configuration of each processing unit in the digital camera provided with the multiple shooting function according to the exemplary embodiment of the present invention.

FIG. 4 is a configuration diagram illustrating image processing in a digital camera as an example of an image capturing apparatus provided with a multiple shooting function.

Light beam of a subject that goes through a lens (not illustrated) forms an image through a shutter unit on an image sensor (401). The image sensor (401) captures an image of the subject according to a shooting instruction. An output analog signal which is photoelectrically converted by the image sensor (401), is converted to digital image data (420) (hereinafter referred to as RAW data) in an AD conversion unit (402).

The image sensor (401) includes color filters for a plurality of color components of R (red), G (green), and B (blue) as illustrated in FIG. 9A, and pixels which receive respective bands of light beam. The pixels are arranged in the Bayer array and the RAW data (420) includes image data of R, G, and B. A numerical number attached to RGB in FIGS. 9A to 9G indicates a location of RGB in a matrix. For example, R24 indicates an R pixel located at a third row and a fifth column.

The RAW data (420) is subjected to white balance processing in the white balance (WB) processing unit (403). A white balance controlling value for carrying out white balance is supplied from a central processing unit (404) (CPU).

The CPU (404) analyzes the RAW data to calculate a most appropriate white balance value. Alternatively, the CPU (404) previously prepares a table of a white balance controlling value that is the most appropriate for colors of various light sources, in a random access memory (RAM) (not illustrated) in order to select and supply a table designated by a user. The user can freely switch to automatic white balances or pre-set white balance appropriate for each light source, and output the white balance controlling value.

The RAW data subjected to the white balance processing is once stored in the memory (405). Regions for storing the RAW data in a plurality of shootings are kept in the memory (405) and the image data is written in a different region for each shooting.

The memory (405) is controlled by a memory control unit (406). The memory control unit (406) can perform control to indicate "image data in what times of shooting" or "a position (an address) of a pixel within a screen" when the data is written in or read out from the memory (405).

The next comparison processing unit (407) reads out from the memory (405) a pixel from each of a plurality of screens referring to position information (an address) specified by the memory control unit (406) to determine their magnitude relation. The comparison result output from the comparison processing unit (407) shows an address of the selected screen to indicate a screen and a pixel which have been selected as a result of the magnitude relation comparison.

The comparison result thus output is fed back to the memory control unit (406). Since this comparison processing unit (407) is a point of the present invention, it will be described in detail below.

A pixel of one screen is read out according to an address indicated by the comparison result input to the memory control (406). The read out image data including pixels of one screen is transmitted to a low pass filter (LPF) processing unit (161), and smoothing processing is carried out on a boundary between the read out screens as described below.

Next, the image data subjected to the LPF processing is transmitted to the pre-filter processing unit (162), where the image data arranged in the Bayer array including RGB pixels as illustrated in FIG. 9 is divided into three virtual plan views, FIG. 9B, FIG. 9C, and FIG. 9D, constituted by R pixels, G pixels, and B pixels. The location where no pixel is present in each plane is filled in with zero.

Each plane is tap-filtered in a horizontal and a vertical direction, and the planes are interpolated with zero as shown from FIG. 9B to FIG. 9E, from FIG. 9C to FIG. 9F, and from FIG. 9D to FIG. 9G. For example, a filter with three taps may have low pass filter characteristics of "1-2-1", and a filter with five taps may have low pass filter characteristics of "1-4-6-4-1". The matrix conversion processing is performed on the RGB image data of three planes thus obtained by the pre-filter processing unit (462), in the matrix conversion processing unit (463).

The matrix conversion processing is performed on each pixel located at the same position in FIGS. 9E, 9F, and 9G, from Rab-Gab-Bab into image data of a luminance signal Y ab—a color difference signal Cr ab—a color difference signal Cb ab as illustrated in FIGS. 10A, 10B, and 10C.

Then, various processing such as gamma correction, sharpness processing, and color conversion processing is performed on the three dimensional image data of YCrCb in a development processing unit (464). After that, the image data is output as final image data and stored in a recording medium (465) as JPEG image data constituted by YCrCb.

With reference to each step of the flow chart in FIG. 6, a method for multiplexing a plurality of images captured by the digital camera will be described based on the processing flow in FIG. 1, which is a point of the present invention.

Among imaged RAW data (420), firstly captured RAW data (first image data) is RAW 1 (101), secondly captured RAW data (second image data) is RAW 2 (111), and thirdly captured RAW data (third image data) is RAW 3 (131).

The firstly captured RAW 1 (101) and the secondly captured RAW 2 (111) are subjected in the WB processing unit (403) to white balance processing 1 (102) in step 603 and in step 606, respectively.

In the white balance processing 1 (102) and the white balance processing 2 (112), a user may vary the controlling value to be different for each shooting.

The RAW 1 and RAW 2 subjected to the white balance processing are once stored in the spatial memory 1 (103) and spatial memory 2 (113) in step 604 and in step 607, respectively. The spatial memory 1 (103) and spatial memory 2 (113) are kept within a memory (405).

The image data readout from the memories is branched into image data (104 and 114) and image data (105 and 115). The image data (104 and 114) is used to determine brightness of a pixel when the image is multiplexed. The image data (105 and 115) is used when the subject image is subjected to the multiplexing processing to obtain a final image.

In step 608, region dividing processing (141 and 144) is performed on the image data (104 and 114) for determining light and dark, respectively. Through the region dividing processing (141 and 144), the image data is divided into equally sized block regions within a screen. For example, the screen is segmented such that one block includes 16 pixels (4 pixels (longitudinal)×4 pixels (horizontal)) as a unit. In the screen, 4 pixels (R), 8 pixels (G), and 4 pixels (B), constitute one block.

In step 609, average value calculation (142 and 145) is performed on each block obtained by the region dividing. In the average value calculation (142 and 145), average values of R, G, and B are calculated for each color component. In the calculation, weighted average may be carried out for the purpose of, for example, changing a contributing ratio of R, G, and B as necessary.

FIG. 9A shows a location at an upper left end of one screen. Within this block (00), following calculation is carried out.

$$R\text{ave}00=(R00+R02+R20+R22)/4 \quad (1)$$

$$G\text{ave}00=(G01+G03+G10+G12+G21+G23+G30+G32)/8 \quad (2)$$

$$B\text{ave}00=(B11+B13+B31+B33)/4 \quad (3)$$

The above formulae are similarly applied to other blocks, and data of three planes of Rave, Gave and Bave shown in FIGS. 10A to 10C is converted into elements of Br, S, and H shown in FIGS. 10D to 10F by using a 3×3 matrix 1. This processing is matrix 1 conversion processing (143 and 146) to be performed in step 610. In the matrix 1 conversion processing (143 and 146), the same matrix coefficient is used.

On the thus obtained brightness components, brightness comparison processing (147) is performed which compares blocks located at the same position in the first screen and the second screen. If the brightness is not at the same level (No in step 611), the processing advances to step 612. If the brightness of the block (00) read from the memory 1 (103) for the first shooting is greater than the brightness of the block (00) read from the memory 2 (113) for the second shooting (Yes in step 612), the processing advances to step 613. In step 613, each address of the pixels within the block (00), and the information in the first shooting synchronized with the address, are output as a comparison result (150).

If the brightness of the block (00) read from the memory 1 (103) for the first shooting is less than the brightness of the block (00) read from the memory 2 (113) for the second shooting (No in step 612), the processing advances to step 614. In step 614, each address of the pixels within the block (00), and the information in the second shooting synchronized with the address, are output as a comparison result (150).

If the brightness of the block (00) read from the memory 1 (103) for the first shooting is equal to the brightness of the block (00) read from the memory 2 (113) for the second shooting (Yes in step 611), the processing advances to step 615. In step 615, saturation comparison processing (148) is performed, in which saturation comparison is performed between the blocks.

If the saturation is not at the same level as a result of the comparison (No in step 615), the processing advances to step 616. If the saturation of the block (00) read from the memory 1 (103) for the first shooting is greater than the saturation of the block (00) read from the memory 2 (113) for the second shooting (Yes in step 616), the processing advances to step 617. In step 617, each address of the pixels within the block (00), and the information in the first shooting synchronized with the address, are output as a comparison result (150).

If the saturation of the block (00) read from the memory 1 (103) for the first shooting is less than the saturation of the block (00) read from the memory 2 (113) for the second shooting (No in step 616), the processing advances to step 618. In step 618, each address of the pixels within the block (00), and the information in the second shooting synchronized with the address, are output as a comparison result (150).

If the saturation of the block (00) read from the memory 1 (103) for the first shooting is equal to the saturation of the block (00) read from the memory 2 (113) for the second shooting (Yes in step 615), the processing advances to step 619. In step 619, hue comparison processing is performed, in which hue comparison processing (149) is performed between the blocks located at the same position.

If the hue of the block (00) read from the memory 1 (103) for the first shooting is equal to or greater than the hue of the block (00) read from the memory 2 (113) for the second shooting (Yes in step 619), the processing advances to step 620. In step 620, each address of the pixels within the block (00), and the information in the first shooting synchronized with the address, are output as a comparison result (150).

If the hue of the block (00) read from the memory 1 (103) for the first shooting is less than the saturation of the block (00) read from the memory 2 (113) for the second shooting (No in step 619), the processing advances to step 621. In step 621, each address of the pixels within the block (00), and the information in the second shooting synchronized with the address, are output as a comparison result (150).

In step 622, information combining the thus obtained address of each pixel with the information in the first or second shooting is subjected to address management (140) in a memory control unit (406).

When the comparison results about all blocks are output in step 623, a memory control unit (406) reads out the image data of one screen from the memory for each pixel, in the address management processing (140). At this time, if the information synchronized with the read pixel indicates the first shooting, the pixel data from the memory 1 (103) is output from a memory unit (405) in step 624. If the information synchronized with the read pixel indicates the second shooting, the pixel is switched over and the pixel data from the memory 2 (113) is output from the memory unit (405) in step 624.

In this case, if the third time shooting or thereafter is carried out and is multiplexed on the multiple images of the first and second shooting, the processing unit same as the one used for the first and second shooting is used as a processing unit in the camera.

In FIG. 1 illustrating a processing flow, for simplicity's sake in describing the processing flow, the multiplexing processing for the third shooting and thereafter is segmented by a dashed line (180) separating a lower part which shows a flow same as a portion of an upper part of the diagram.

In step 630, the multiplexed image data for the first and second shooting output from the memory unit (405) is stored in the memory 1 (103) again. Next in step 632, the image data RAW 3 (131) obtained when the third shooting is carried out, is subjected to the WB processing 3 (132) using a WB controlling value in a WB processing unit (403) similar to the first and second processing.

Then, in step 633, the image data of the third shooting is stored in the memory 2 (113). After that, the image data in the memory 1 (103) and the memory 2 (113) is subjected to the multiplexing processing which is similar to the one for the first and second shooting (step 608 to step 624).

After the multiple shooting is finished, in step 629, it is determined whether next shooting is to be carried out. If it is determined that shooting is to be ended, the processing advances to step 630. In step 630, the multiple image data output from the memory 1 (103) and the memory 2 (113) which is switched over by a switch (SW) (151) for each pixel, is transmitted to an LPF processing unit (461) and subjected to LPF processing.

The LPF performs processing for making less visible a boundary of adjacent blocks between the first and second shooting. For example, the pixel data in the Bayer array illustrated in FIG. 9A is developed into RGB planes shown in FIGS. 9B, 9C, and 9D. The filter of LPF characteristics may be applied both horizontally and vertically between the same pixel data of RGB using a 5-tap filter of (1-4-6-4-1) and the like.

Next, in step 631, adaptive interpolation processing (162) is carried out in a pre-filter 2 processing unit (462) to obtain RGB values of each pixel in FIGS. 9E, 9F, and 9G to make less visible the boundary of adjacent blocks between the first and second shooting. For example, when a pixel value of G33 in FIG. 9F is to be obtained, the following formulae that find out a difference between the pixels in a longitudinal and a lateral direction, are employed.

$$Y=|-R13+2 \cdot R33-R53|+|G23-G43| \text{(longitudinal direction)} \quad (4)$$

$$X=|-R31+2 \cdot R33-R35|+|G32-G34| \text{(lateral direction)} \quad (5)$$

Here, according to magnitude relation between X and Y, a determination is made in a longitudinal and a lateral direction to check directionality and obtain an interpolated pixel value.

$$G33=(G23+G43)/2(X>Y) \quad (6)$$

$$G33=(G32+G34)/2(X<Y) \quad (7)$$

$$G33=(G23+G43+G32+G34)/4(X=Y) \quad (8)$$

Thus, the multiple image data including three planes of RGB smoothed through the pre-filter 2 processing is transmitted to a matrix 2 conversion processing unit (463). In step 632, through matrix 2 conversion processing (163), RabGabBab for each pixel in FIGS. 9E, 9F, and 9G is matrix-converted to image data of YabCrabCbab as shown in FIGS. 10A, 10B, and 10C.

A conversion coefficient in the matrix 2 conversion processing (163) may be different from the conversion coefficient in the matrix 1 conversion processing (163) in a comparison processing unit (143 and 146). Any coefficient can be used if an image quality obtained as a result of development processing is acceptable.

In step 633, the development processing (164) including gamma processing, sharpness processing, or color conversion processing is performed on the YCrCb data in a development processing unit (464). In step 644, the image data subjected to the development processing is output as final combined data, which is stored (165) in a recording medium by a recording medium recording unit (465).

Thus, according to the present exemplary embodiment, with respect to the image data which is captured a plurality of times, each screen is divided into regions and an average value of the same color is obtained. The average value is subjected to the matrix conversion and the data located at the same position is compared with each other. According to the comparison result, it is determined which pixel of the captured image is to be selected as the image data. As a consequence, a plurality of images subjected to the multiple shooting can be multiplexed as shown in FIG. 11D without intermingling with each other, instead of FIG. 11C.

According to the present exemplary embodiment, a screen is divided into regions to calculate an average value for each region constituted by a plurality of pixels (M pixels×N pixels). However, instead of the region division, for each pixel, a region of M pixels×N pixels may be set centering around the target pixel to calculate an average value of adjacent pixels of the same color within the region.

For example, R22 is presumed to be the target pixel in FIG. 9A. An average value is calculated centering around the pixel R22 among pixels of the same color within a region of 5 pixels×3 pixels. In this case, within the block centering around R22, following calculation is carried out.

$$Rave\ (R22)=(R20+R22+R24)/3 \quad (9)$$

$$Gave\ (R22)=(G10+G12+G14+G21+G23+G30+G32+G34)/8 \quad (10)$$

$$Bave\ (R22)=(B11+B13+B31+B33)/4 \quad (11)$$

In step 610, average values (i.e., Rave(R), Gave(R), and Bave(R)) calculated through the above formulae are matrix-converted into elements of Br, S, and H as shown in FIGS. 10D, 10E, and 10F (143 and 146). With respect to the calculated values, a comparison is made in order of (01), (02), (03), . . . pixel by pixel in priority order of brightness, saturation, and hue to determine a pixel which has a greater value between pixels located at the same position. Thus, it is determined whether at the target pixel location, a pixel obtained in the first shooting or a pixel obtained in the second shooting should be output.

In this case, since a pixel in the first shooting or a pixel in the second shooting is selected for each pixel, the LPF processing (161) in step 630 for smoothing the boundary between the blocks may be omitted.

Further, according to the present exemplary embodiment, as an example, two screens are compared to select an image showing a larger BrSH value and to output the multiple image. However, conversely, an image having a smaller BrSH value can be selected in priority order of Br, S, and H to prioritize and overlay a darker image (or a light-colored image or an image of a smaller hue value).

Figure 11A:
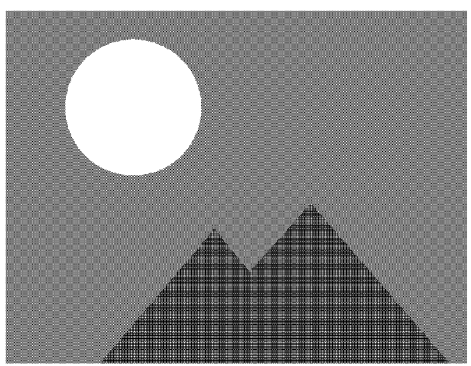
FIGS. 11A to 11D are diagrams illustrating images obtained as a result of the multiple shooting.
Figure 11B:
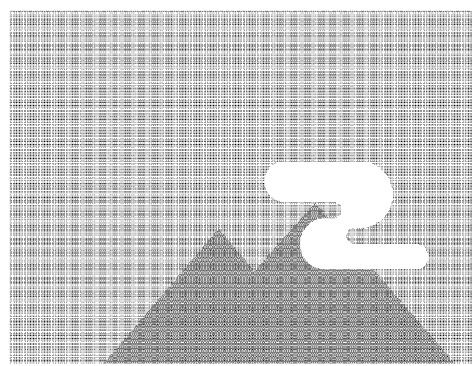
Figure 11C:
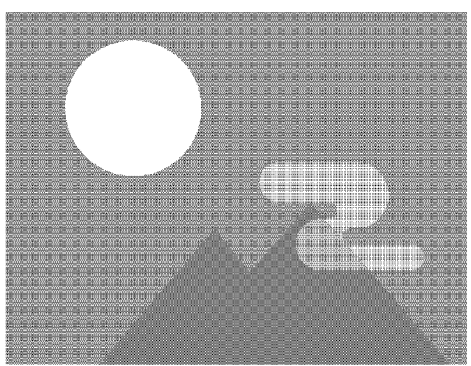
Figure 11D:
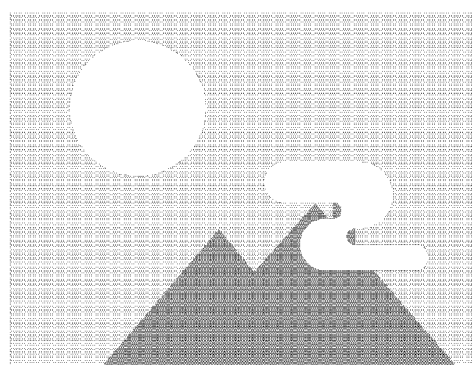
Figure 12A:
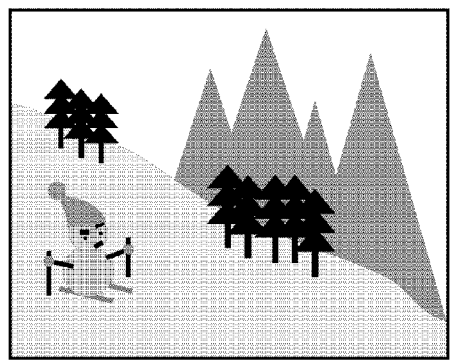
FIGS. 12A to 12C are diagrams illustrating images obtained as a result of the multiple shooting.
Figure 12B:
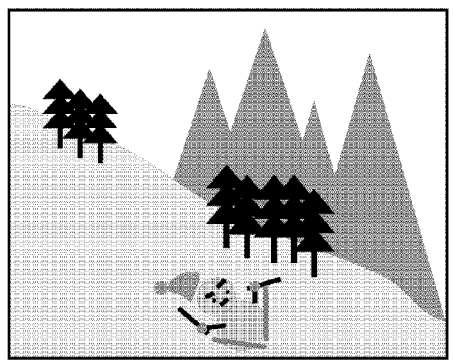
Figure 12C:
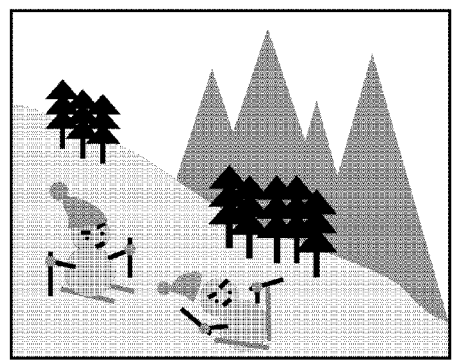
Figure 13:
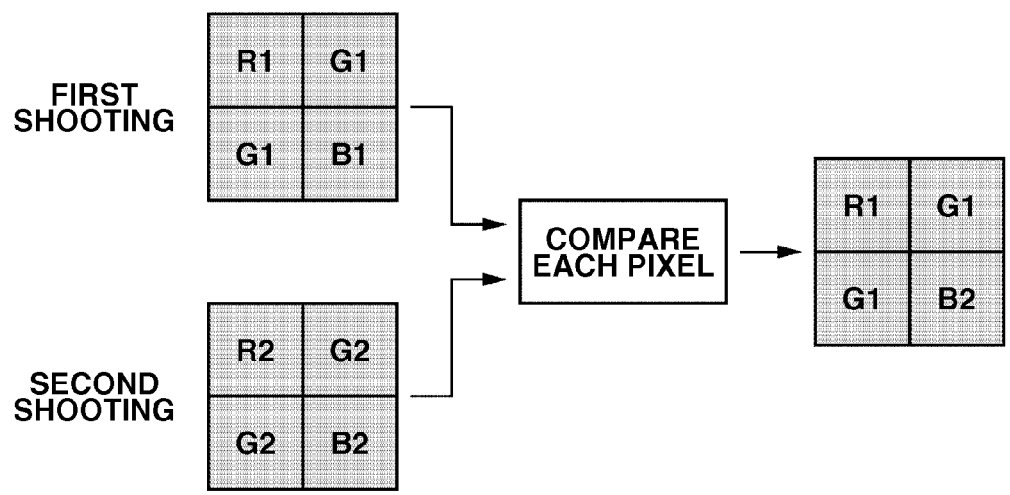
FIG. 13 is a diagram illustrating pixels output as a result of magnitude comparison for each pixel.

In this case, in contrast to the image of the moon and the cloud in FIGS. 11A to 11C, darker pixels as illustrated in FIG. 12C can be selected from captured images in FIGS. 12A and 12B and a multiplexed result can be output. This processing is effective when images of persons are captured in an overlaying manner against a background of a snow scene like a ski site.

Further, according to the present exemplary embodiment, the comparison is made block by block in priority order of brightness, saturation, and hue, and output of a pixel is determined on the basis of the comparison result. However, the comparison does not necessarily have to be made with respect to all of brightness, saturation, and hue, but the comparison may be made on the basis of any one of them. Furthermore, the priority order may be changed according to a shooting mode, a shooting condition, and an image analyzing result etc., or the comparison about brightness, saturation, and hue may be selectively made.

Figure 2:
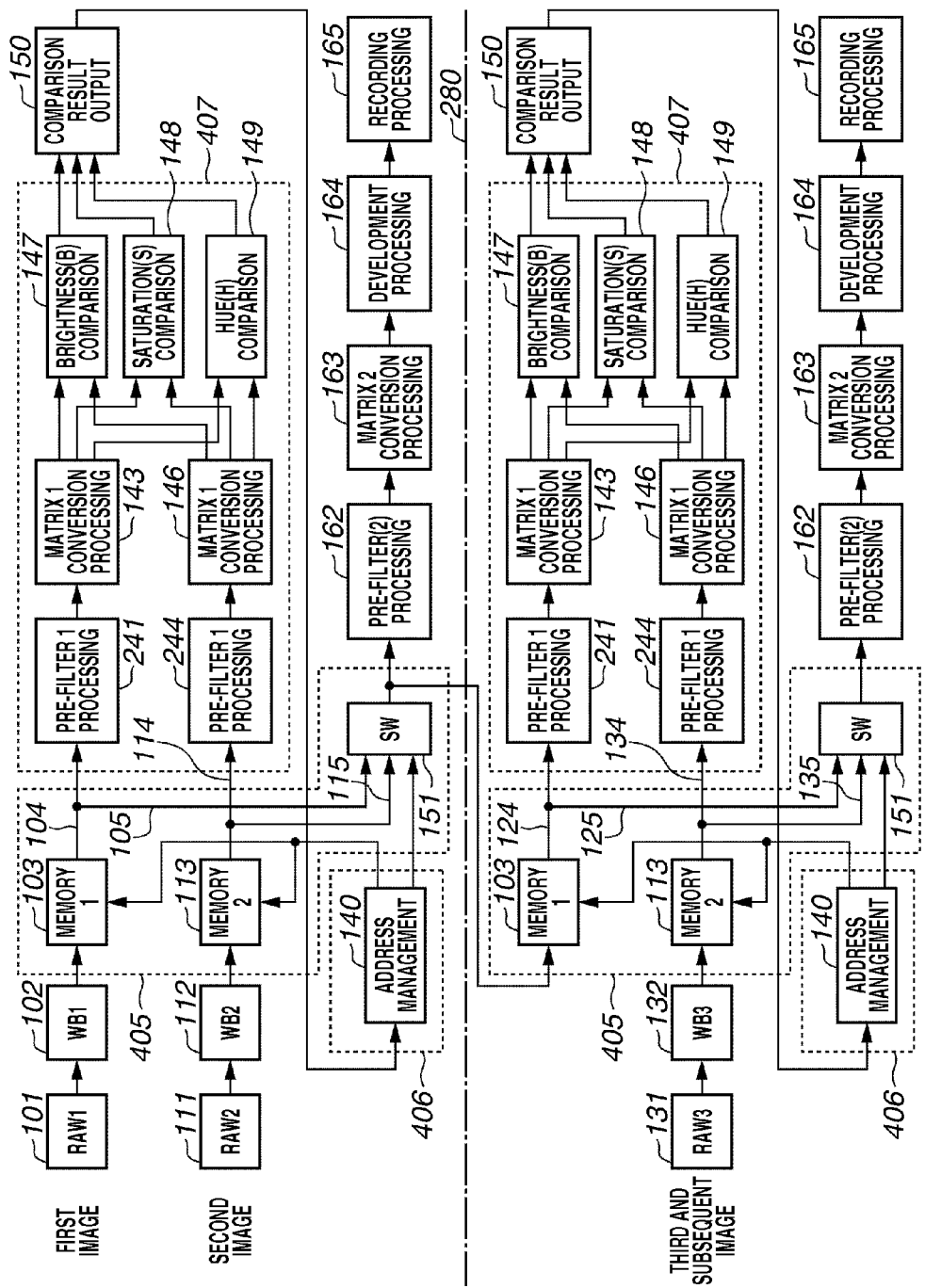
FIG. 2 illustrates is a block diagram illustrating a processing flow of multiple shooting by a digital camera according to a second exemplary embodiment of the present invention.
Figure 7B:
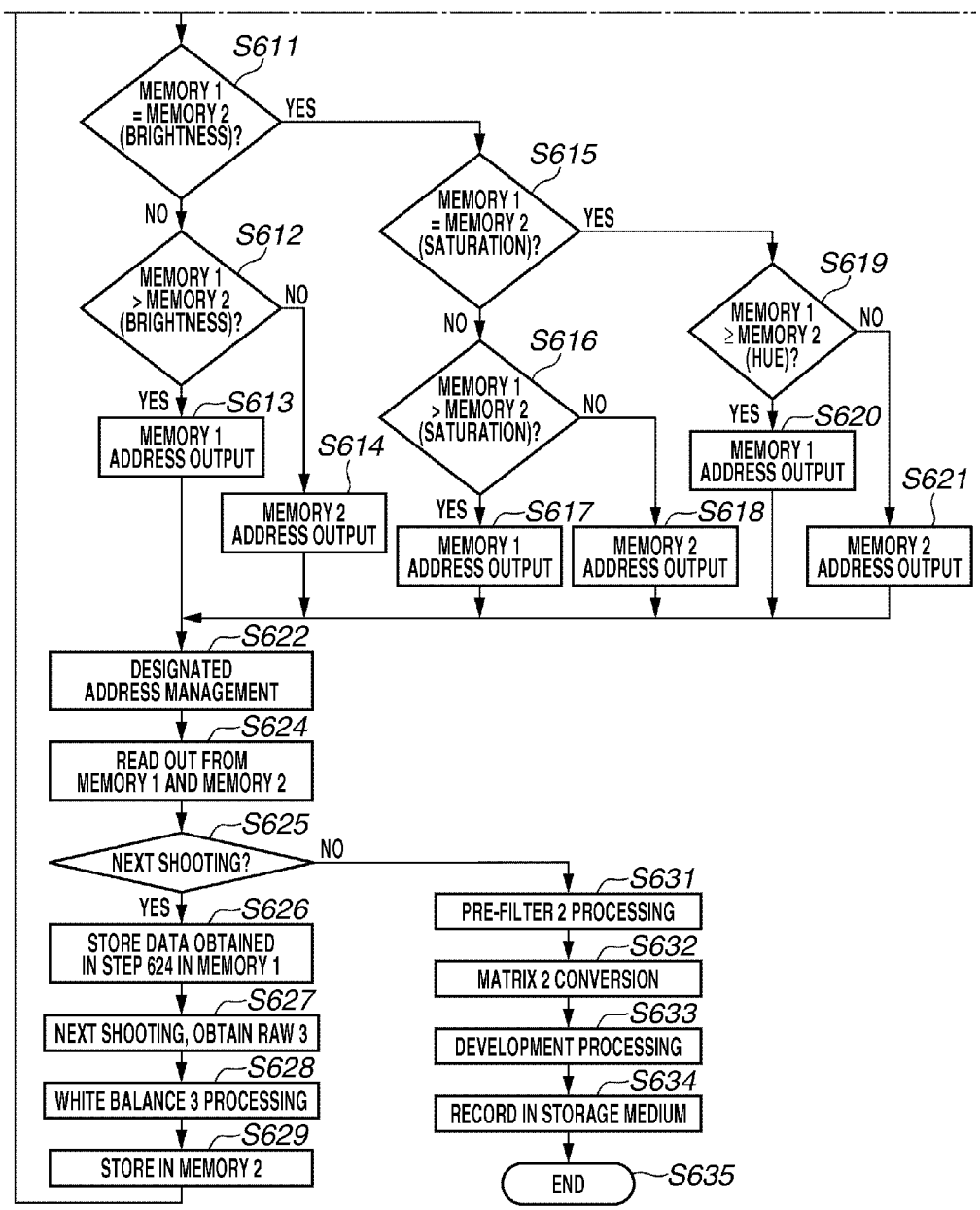

With reference to FIG. 2, FIG. 4, and FIG. 7, a digital camera provided with a multiple shooting function according to the second exemplary embodiment of the present invention will be described. According to the second exemplary embodiment, as a minimum region unit of a block region division unit constituted by a plurality of pixels according to the first exemplary embodiment, one pixel is taken as one block region unit to compare the first shooting and the second shooting.

Configuration of each unit within the camera is similar to FIG. 4 described in the first exemplary embodiment. FIG. 2 illustrates a block diagram illustrating a flow of each processing, and FIG. 7 illustrates a flow chart corresponding to the block diagram.

Procedures until the image data RAW 1 (101) in the first shooting and RAW 2 (111) in the second shooting are subjected to the WB 1 processing (102) and the WB 2 processing (112) and written in the memory 1 (103) and the memory 2 (113) regions of the memory (405) respectively, are similar to the first exemplary embodiment.

A description will be given concerning control to transmit image data (104 and 114) from the memory 1 (103) and the memory 2 (113) to a comparison processing unit (407) through address management (140). A comparison is made in order of (01), (02), (03), . . . from a pixel position (00) at an upper left end of the screen, pixel by pixel. When one pixel unit is transmitted to the comparison processing unit (407), adjacent pixels in a horizontal and a vertical direction are transmitted at the same time, and are tap-filtered in a horizontal and vertical direction through pre-filter processing 1 (241 and 244) in step 709.

For example, when pixels are arranged as illustrated in FIG. 9A, planes of RGB are filled in with zero as illustrated in FIG. 9B, FIG. 9C, and FIG. 9D to perform development into three planes. On each pixel of three planes at the same position, pixel interpolation including direction determination for checking continuity of a pixel in a horizontal and a vertical direction is performed.

For example, when a pixel value of G33 in FIG. 9F is to be obtained, following formulae that find out a difference between pixels in a longitudinal and a lateral direction, are employed.

$$Y=|-R13+2\cdot R33-R53|+|G23-G43|(\text{longitudinal direction}) \quad (12)$$

$$X=|-R31+2\cdot R33-R35|+|G32-G34|(\text{lateral direction}) \quad (13)$$

Here, based on magnitude relation between X and Y, a determination is made in a longitudinal and a lateral direction to check directionality and obtain an interpolated pixel value.

$$G33=(G23+G43)/2(X>Y) \quad (14)$$

$$G33=(G32+G34)/2(X<Y) \quad (15)$$

$$G33=(G23+G43+G32+G34)/4(X=Y) \quad (16)$$

Thus, in step 610, the multiple image data of RGB smoothed through the pre-filter 1 processing (241 and 244) is matrix-converted from RGB in FIGS. 9E, 9F, and 9G to BrSH data in FIGS. 10D, 10E, and 10F, similar to the first exemplary embodiment. After that, the BrSH results in the first shooting and the second shooting are compared similar to the first exemplary embodiment.

The comparison processing is made in order of (01), (02), (03), . . . pixel by pixel in priority order of brightness, saturation, and hue to determine a pixel showing a greater value among pixels located at the same position. Thus, it is determined whether the pixel in the first shooting or in the second shooting at that position is to be output.

Further, similar to the first exemplary embodiment, image processing of one screen is performed on the basis of the selected pixels, and as a result of multiple exposure, the processed screen is recorded on a recording medium. Processing in the third shooting and thereafter is also performed pursuant to the first exemplary embodiment.

According to the present exemplary embodiment, continuity of the image is determined in a horizontal and a vertical direction through the pre-filter 1 processing (241 and 244). Since comparison and determination are carried out pixel by pixel, the LPF processing (161) described in the first exemplary embodiment can be omitted.

Further, each coefficient defining the characteristics of the pre-filter 1 processing (241 and 244) may be different from a coefficient for the pre-filter 2 processing (162) in the image processing for outputting the final multiplexed result. For example, the pre-filter 1 processing (241 and 244) may have a tap coefficient achieving a more greater LPF effect (e.g., an enlarged tap number) compared with the pre-filter 2 processing (162) in the image processing for final output.

Thus, when Br, S, and H are compared, an influence of surrounding pixels is increased. Accordingly, in a comparison result, an isolated point which is a pixel of a second shooting result singly left in a first shooting result can be removed, so that the continuity of the images in the first shooting or the second shooting can be maintained.

Thus, according to the present exemplary embodiment, the image data which is captured multiple times, is developed into brightness Br, saturation S, and hue H, at the same position for each pixel of each screen. On the basis of the comparison result of the developed image data, it is determined which pixel of captured image is to be selected as the image data. Thus, a plurality of images obtained by multiple shooting can be overlaid without intermingling with each other.

Figure 3:
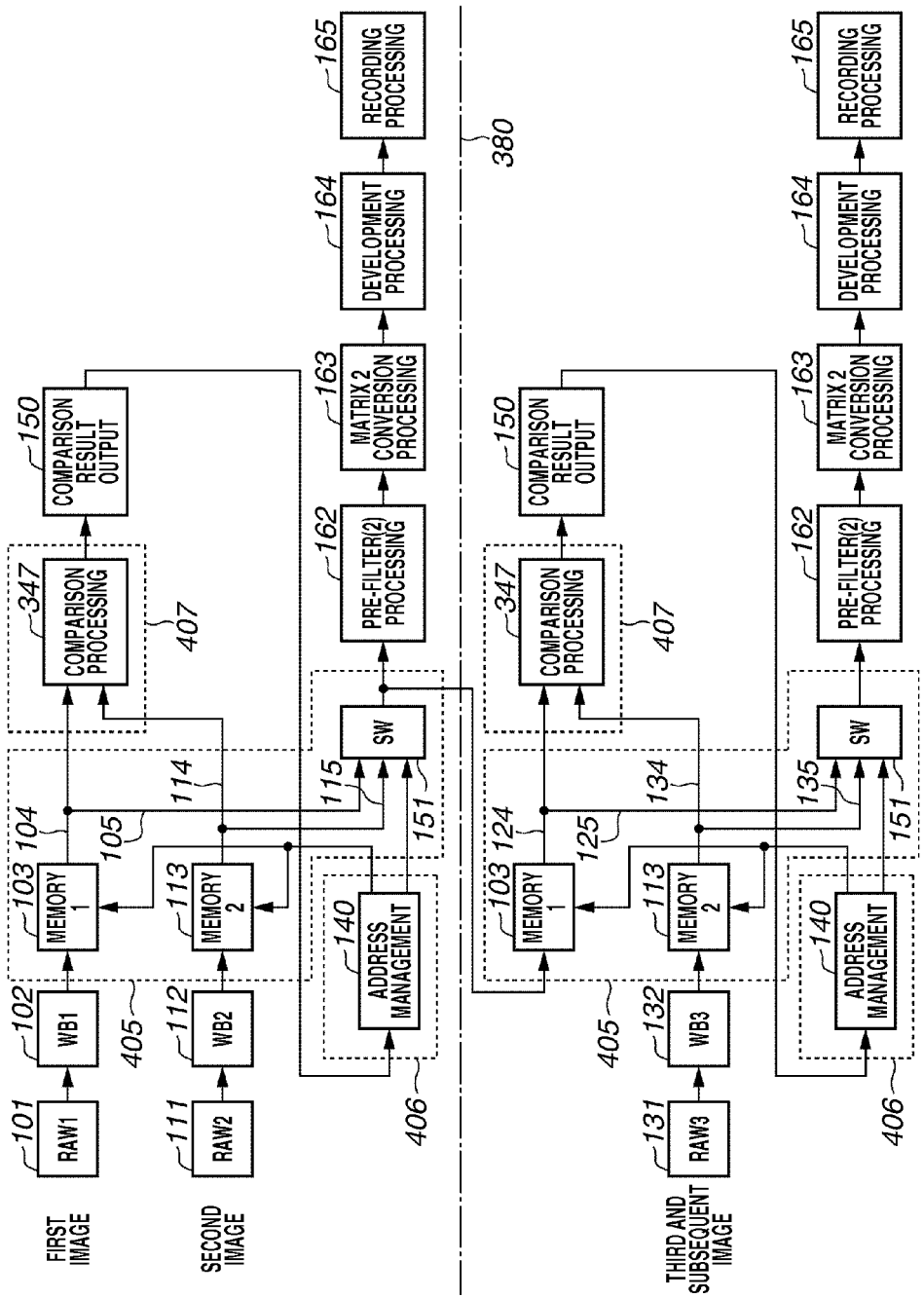
FIG. 3 is a block diagram illustrating a processing flow of multiple shooting by a digital camera according to a third exemplary embodiment of the present invention.
Figure 8:
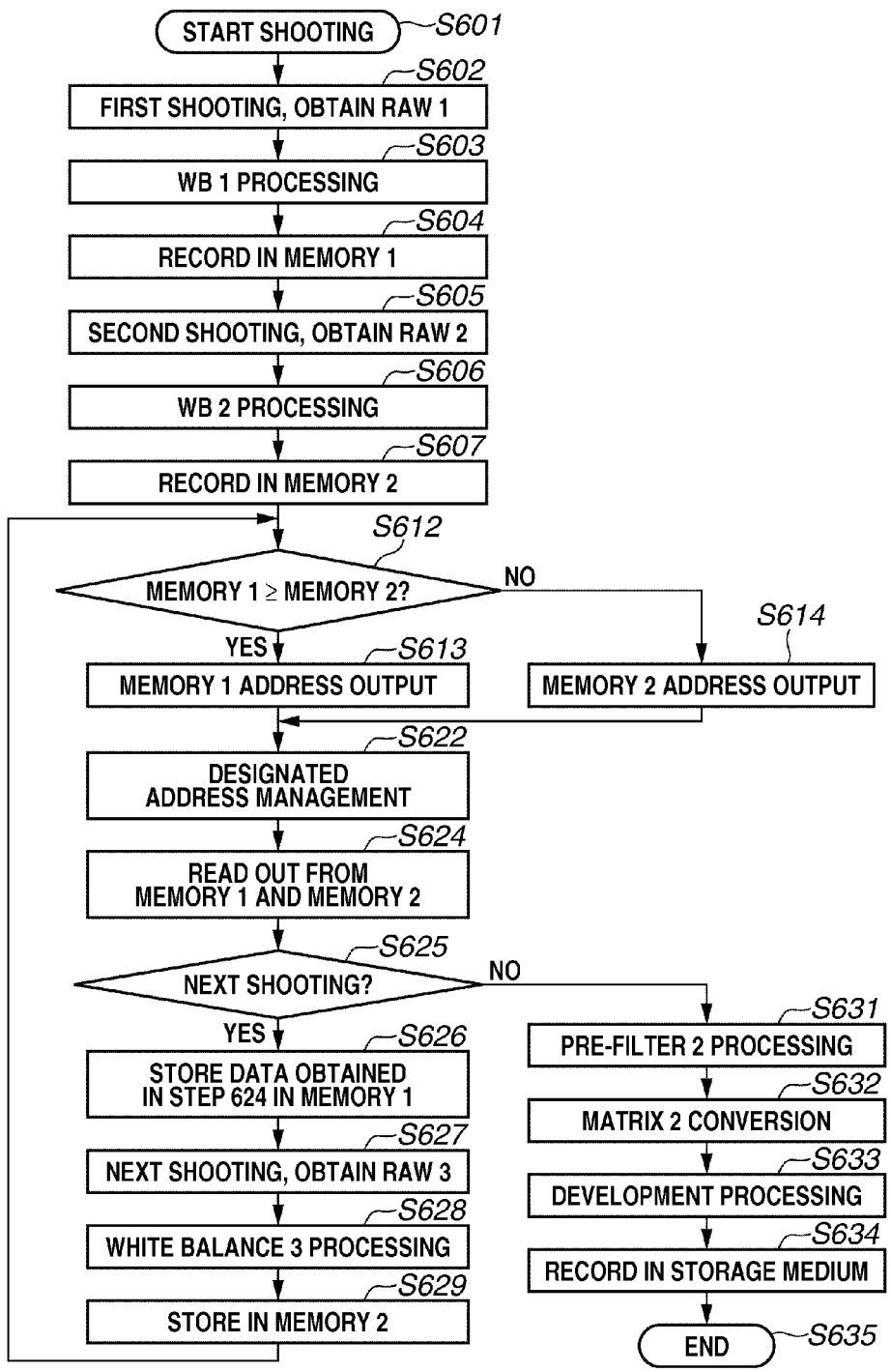
FIG. 8 is a flowchart corresponding to the image processing in FIG. 3.

In a third exemplary embodiment, the hardware configuration according to the second exemplary embodiment is simplified as much as possible to speedup its processing. With reference to FIGS. 3, 4, and 8, a digital camera provided with a multiple shooting function according to the third exemplary embodiment will be described as follows.

The third exemplary embodiment is similar to the second exemplary embodiment in that one pixel is dealt with as a unit of one block region, and first and second shootings are compared. The third exemplary embodiment is different in that when making the comparison, peripheral pixels are not referenced and levels are compared only with respect to pixels at a target position.

A configuration of each processing unit within the digital camera is similar to FIG. 4 described with respect to the first exemplary embodiment. A block diagram that shows flow of each processing is illustrated in FIG. 3 and a flow chart corresponding to the block diagram is illustrated in FIG. 8.

The procedures until RAW (101) and RAW (111) are subjected to WB 1 processing (102) and WB 2 processing (112) and are written in the memory 1 (103) and the memory 2 (113) regions of the memory (405) respectively, are similar to the first and second exemplary embodiments (steps 601 to 607).

Next, through address management (140), image data is transmitted from the memory 1 (103) and the memory 2 (113) to a comparison processing unit (407). The image data is transmitted pixel by pixel, from a pixel position (00) at an upper left end of the screen of FIG. 9A in order of (01), (02), (03), . . . .

In the comparison processing unit (407), the pixel data (104) in the first shooting and the pixel data in the second shooting at the same position is subjected to the comparison processing (347) with respect a magnitude level of the pixels, in steps 612 and 614. In step 622, according to a result of the comparison (150), it is determined whether to adopt a pixel in the first shooting or in the second shooting.

After that, the output processing of a final multiple image and operations concerning the third shooting and thereafter are similar to the first and second exemplary embodiments.

In the image processing method in the multiple shooting as above described, a red part of the subject in the first shooting and a blue part of the subject in the second shooting may can be located at the same position. In such a situation, both colors may intermingle with each other. More specifically, with respect to an R pixel, R1 in the first shooting>R2 in the second shooting, while with respect to a B pixel, B1 in the first shooting<B2 in the second shooting. Therefore, the R1 pixel in the first shooting and the B2 pixel in the second shooting are developed in combination, so that the colors may become intermingled with each other.

However, as can be seen from the processing flow, substantially simplified processing can be realized as compared to the first and second exemplary embodiments. Further, a processing speed can be much faster. Accordingly, also according to the third exemplary embodiment, the multiple shooting can be implemented by comparing image brightness and overlaying the images.

The preferable exemplary embodiments of the present invention have been described. However, the present invention is not limited to those embodiments and can be modified and changed in various ways within a scope of the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-025286, filed Feb. 8, 2012, which is hereby incorporated by reference herein in its entirety.

What is claimed is:

1. An image capturing apparatus comprising:
    an image sensor having pixels including color filters of a plurality of color components and configured to capture an image and output image data of the captured image;
    a white balance processing unit configured to perform white balance processing on the image data output from the image sensor;
    a memory storing the image data subjected to the white balance processing;
    a comparison unit configured to compare brightness of regions located at corresponding positions in first image data and second image data, wherein the first image data and the second image data are read out from the memory;
    a generation unit configured to output either the first image data or the second image data for each region according to a comparison result made by the comparison unit, and to generate combined image data;
    an image processing unit to perform image processing on the combined image data, and
    a recording unit configured to record the combined image data subjected to the image processing, in a recording medium.

2. The image capturing apparatus according to claim 1, wherein the comparison unit performs processing for dividing one screen into regions including pixels equal to or greater than one pixel for each of the plurality of image data, processing for calculating an average value according to a color component for each divided region, processing for converting the average data calculated according to a color component into a brightness component, a saturation component, and a hue component through matrix conversion processing, and performs control to compare a magnitude relation with respect to at least one of the brightness component, the saturation component, and the hue component.

3. The image capturing apparatus according to claim 1, wherein the comparison unit performs processing for extracting a target pixel and a plurality of pixels present in its vicinity having the same color component, for each target pixel in each image data, and calculating an average value for each color component, processing for converting the average data calculated according to a color component into a brightness component, a saturation component, and a hue component through matrix conversion processing, and performs control to compare a magnitude relation with respect to at least one of the brightness component, the saturation component, and the hue component.

4. The image capturing apparatus according to claim 1, wherein the comparison unit performs filter processing on each of the image data according to each of same color components to give each color component data to each pixel, processing for converting each pixel into a brightness component, a saturation component, and a hue component through matrix conversion processing, and performs control to compare a magnitude relation with respect to at least one of the brightness component, the saturation component, and the hue component.

5. The image capturing apparatus according to claim 1, wherein the filter processing performed before the data is converted by the comparison unit to make a comparison, is processing with characteristics of a low pass filter.

6. The image capturing apparatus according to claim 1, wherein the filter processing performed before the data is converted by the comparison unit to make a comparison, is processing in which interpolation is carried out through adaptive interpolation processing on the basis of directionality of a magnitude relation among pixels.

7. The image capturing apparatus according to claim 1, wherein the comparison unit makes a comparison between pixels located at the same position in first image data and second image data.

8. An image capturing apparatus comprising:
an image sensor having pixels including color filters of a plurality of color components and configured to capture an image and output image data of the captured image;
a comparison unit configured to compare brightness of regions located at corresponding positions in first image data and second image data, wherein the first image data and the second image data are output from the image sensor; and
a generation unit configured to output either the first image data or the second image data for each region according to a comparison result made by the comparison unit, and to generate combined image data.

9. The image capturing apparatus according to claim 1, wherein the image processing unit performs image processing including gamma processing on the combined image data.

10. The image capturing apparatus according to claim 1, wherein the generation unit is configured to output a lighter image between the first image data and the second image data for each region according to a comparison result made by the comparison unit.

11. The image capturing apparatus according to claim 1, wherein the generation unit is configured to output a darker image between the first image data and the second image data for each region according to a comparison result made by the comparison unit.

12. A method of controlling image capturing apparatus having an image sensor having pixels including color filters of a plurality of color components and configured to capture an image and output image data of the captured image, the method comprising:
performing, by a circuit, white balance processing on the image data output from the image sensor;
storing, by a circuit, the image data subjected to the white balance processing;
comparing, by a circuit, brightness of regions located at corresponding positions in first image data and second image data, wherein the first image data and the second image data are read out from a memory;
outputting, by a circuit, either the first image data or the second image data for each region according to a comparison result, and to generate combined image data;
performing, by a circuit, image processing on the combined image data; and
recording, by a circuit, the combined image data subjected to the image processing, in a recording medium.

13. A method of controlling image capturing apparatus having an image sensor having pixels including color filters of a plurality of color components and configured to capture an image and output image data of the captured image, the method comprising:
comparing, by a circuit, brightness of regions located at corresponding positions in first image data and second image data, wherein the first image data and the second image data are output from the image sensor; and
outputting, by a circuit, either the first image data or the second image data for each region according to a comparison result and generating combined image data.

14. The image capturing apparatus according to claim 1, wherein the region is one pixel.

15. The image capturing apparatus according to claim 1, wherein the region is a block region including a plurality of pixels.

* * * * *